United States Patent
Jamin et al.

(10) Patent No.: US 11,343,700 B2
(45) Date of Patent: May 24, 2022

(54) SPECTRUM MANAGEMENT FOR A POINT-TO-MULTIPOINT WIRELESS NETWORK

(71) Applicant: Cambium Networks Ltd, Ashburton (GB)

(72) Inventors: Antony Jamin, Ashburton (GB); Antony Holmes, Ashburton (GB)

(73) Assignee: CAMBIUM NETWORKS LTD, Ashburton (GB)

( * ) Notice: Subject to any disclaimer, the term of this patent is extended or adjusted under 35 U.S.C. 154(b) by 217 days.

(21) Appl. No.: 16/861,598

(22) Filed: Apr. 29, 2020

(65) Prior Publication Data
US 2020/0322832 A1 Oct. 8, 2020

Related U.S. Application Data

(63) Continuation of application No. PCT/GB2018/053096, filed on Oct. 25, 2018.

(30) Foreign Application Priority Data

Oct. 31, 2017 (GB) ..................................... 1717968

(51) Int. Cl.
H04W 72/08 (2009.01)
H04W 28/02 (2009.01)
(Continued)

(52) U.S. Cl.
CPC ... *H04W 28/0263* (2013.01); *H04W 28/0268* (2013.01); *H04W 76/11* (2018.02);
(Continued)

(58) Field of Classification Search
None
See application file for complete search history.

(56) References Cited

U.S. PATENT DOCUMENTS

| 7,330,697 B1 | 2/2008 | Bolt et al. |
| 7,330,698 B1 * | 2/2008 | Bolt ..................... H04W 16/10 455/63.1 |

(Continued)

FOREIGN PATENT DOCUMENTS

| CN | 105491669 A | 8/2005 |
| EP | 1560345 A1 | 8/2005 |

(Continued)

OTHER PUBLICATIONS

International Search Report & Written Opinion issued in PCT/GB2018/053096 dated Jan. 31, 2019 (16 pages).

*Primary Examiner* — Ayaz R Sheikh
*Assistant Examiner* — Sori A Aga
(74) *Attorney, Agent, or Firm* — Crowell & Moring LLP

(57) ABSTRACT

In a point to multipoint wireless communications system comprising a master station and a plurality of slave stations operating according to a time division multiplex protocol, a noise and interference level is measured associated with each frequency channels at each slave station, in a predetermined timeslot of the time division multiplex protocol. A histogram is generated of the noise and interference level measurements for each slave station for each frequency channel. A noise and interference level estimate is generated for each frequency channel for each slave station as a predetermined percentile of the respective histogram, and a respective single combined noise and interference level estimate is generated for each frequency channel from the estimates. One of the frequency channels is selected for use in subsequent transmission of frames of the time division multiplex protocol on the basis of the respective single combined noise and interference level estimates.

7 Claims, 10 Drawing Sheets

(51) Int. Cl.
*H04W 76/15* (2018.01)
*H04W 76/30* (2018.01)
*H04W 76/11* (2018.01)
*H04W 84/18* (2009.01)

(52) U.S. Cl.
CPC ........... *H04W 76/15* (2018.02); *H04W 76/30* (2018.02); *H04W 84/18* (2013.01)

(56) References Cited

U.S. PATENT DOCUMENTS 7,333,455 B1   2/2008   Bolt et al.
7,469,013 B1   12/2008  Bolt et al.

FOREIGN PATENT DOCUMENTS

GB            2570278       7/2019
WO      WO 2019/086840 A1   5/2019

* cited by examiner

| | |
|---|---|
| S 7.1 | periodically measure, within a predetermined timeslot of the time division duplex and time division multiplex protocol in which the master station and the slave stations do not transmit, a noise and interference level associated with each one of the plurality of frequency channels at the master station and at each of the plurality of slave stations |
| S7.2 | periodically send noise and interference measurement data from each of the plurality of slave stations to the master station; |
| S 7.3 | generate a plurality of histograms of the noise and interference level measurements for the master station and for each of the plurality of slave stations, each histogram being associated with a respective frequency channel, and each histogram comprising a plurality of bins, each bin corresponding to a predetermined range of noise and interference levels associated with the respective frequency channel |
| S 7.4 | select a respective one of the plurality of frequency channels for use in subsequent transmission of frames of the time division duplex and time division multiplex protocol on the basis of processing the generated histograms for the master station and for each of the plurality of slave stations |

Figure 7

SPECTRUM MANAGEMENT FOR A POINT-TO-MULTIPOINT WIRELESS NETWORK

CROSS-REFERENCE TO RELATED APPLICATIONS

This application is a continuation of International Patent Application No. PCT/GB2018/053096 filed on Oct. 25, 2018, designating the United States and published in English as WO 2019/086840 A1 on May 9, 2019, which claimed priority from GB Application No. 1717968.0, filed on Oct. 31, 2017, the entirety of which are each hereby fully incorporated by reference herein.

TECHNICAL FIELD

The present invention relates generally to wireless communications systems, and more specifically, but not exclusively, to spectrum management techniques for point to multipoint wireless broadband communications systems that provide for increased data throughput and link availability through more efficient use of the electromagnetic spectrum allocated to the system.

BACKGROUND

In recent years, there has been an increasing need for wireless communications systems capable of carrying broadband data, and in particular for point-to-multipoint wireless systems in which a master wireless station is in communication with several slave wireless stations. For example, a point-to-multipoint system may provide backhaul systems and microwave Ethernet bridges, for example providing connectivity to small cell and macro cell infrastructure. Such a need has arisen for a variety of reasons, including the difficulties that users often experience in obtaining high speed Internet access service in some remote areas, and the convenience that wireless systems generally afford to users wishing to set up communications links and networks accessible from locations within urban environments or from locations dispersed across significant geographical distances. A conventional wireless broadband communications system can be set up as a line-of-sight (LOS) system or a non-line-of-sight (NLOS) system. The conventional LOS system typically includes a directional antenna deployed at one or more user locations within the line-of-sight of an antenna at a base station. The conventional NLOS system is typically configured as a multiple input multiple output (MIMO) system including a first plurality of antennas deployed at one end of a communications link, and a second plurality of antennas deployed at the other end of the communications link. Both the LOS system and the NLOS system may be employed in point-to-multipoint applications, in which a transmitter transmits signals over multiple communications channels using known space-time coding and modulation techniques, and one or more receivers capture the transmitted signals and employ signal processing techniques to decode and demodulate the signals to recover user data.

One problem facing conventional wireless broadband communications systems, whether they are configured as LOS or NLOS systems, is that the bandwidth capacity of the communications channels available to the systems is often limited, resulting in severe constraints in the communications capacity of the overall system. In a wireless communications system, such channels are typically defined within a limited portion of the electromagnetic spectrum allocated to the system. To achieve more efficient use of the allocated spectrum, wireless communications systems have employed digital communications techniques that allow data packets corresponding to separate communications sessions to be transmitted along multiple shared channels, obviating the need for a single dedicated channel for each communications session. Such techniques are frequently employed in wireless communications networks including one or more wireless LANs (WLANs), which utilize data packet protocols to communicate between the various nodes of the WLAN. The operational parameters for such WLANs are described in the IEEE 802.11 standard.

More recently, the use of shared frequency bands has exacerbated the problems relating to the constraints in the communications capacity of wireless broadband communications systems. Such a shared frequency band for WLANs is the unlicensed frequency band located at 5 GHz. Due to the unlicensed nature of the shared 5 GHz band, more than one WLAN operating in the 5 GHz band may be deployed within the same geographical area. Further, other types of wireless communications systems and radar operating in the 5 GHz band, or generating frequency harmonics having components in the 5 GHz band, may also be deployed within the same geographical area. As a result, the levels of noise and interference on the channels available to wireless communications systems are likely to increase, thereby significantly reducing data throughput and link availability. It is known to dynamically allocate spectrum in a point-to-point wireless communication system.

It would be desirable to have a point-to-multipoint wireless broadband communications system that makes more efficient use of the electromagnetic spectrum allocated to the system, and that avoids the limitations of prior art systems.

SUMMARY

In accordance with a first aspect of the invention there is provided a method of spectrum management in a point to multipoint wireless communications system comprising a master station and a plurality of slave stations operating according to a time division multiplex protocol, the wireless communications system being operable to transmit and receive signals using a plurality of frequency channels,
  comprising the steps of:
  periodically measuring, within a predetermined timeslot of the time division multiplex protocol in which the master station and the slave stations do not transmit, a noise and interference level associated with each one of the plurality of frequency channels at each of the plurality of slave stations;
  generating a plurality of histograms of the noise and interference level measurements for each of the plurality of slave stations, each histogram being associated with a respective frequency channel, and each histogram comprising a plurality of bins, each bin corresponding to a predetermined range of noise and interference levels associated with the respective frequency channel;
  determining a noise and interference level estimate for each frequency channel for each of the plurality of slave stations as a predetermined percentile of the histogram of measured noise and interference levels associated with the respective frequency channel for the respective slave station;
  generating a respective single combined noise and interference level estimate for each frequency channel from at least the respective noise and interference level estimates for each of the plurality of slave stations; and selecting one of the plurality of frequency channels for use in subsequent transmission of frames of the time division multiplex protocol on the basis of the respective single combined noise and interference level estimates.

This allows a common frequency channel to be selected for reception at each of the slave stations, taking into account the noise and interference environment at each of the slave stations, which may different at each slave station.

In an embodiment of the invention, the method comprises periodically sending noise and interference measurement data from each of the plurality of slave stations to the master station.

This allows the master station to determine combined noise and interference level estimates based on the measured data.

In an embodiment of the invention, the noise and interference measurement data sent from each of the plurality of slave stations to the master station comprises the determined noise and interference level estimate for each frequency channel, and the plurality of histograms is generated at the master station.

This allows the master station to carry out the processing intensive tasks and reduces the processing load on the slave stations, and allows the histograms at the master station to be updated continually.

In an embodiment of the invention, the noise and interference measurement data sent from each of the plurality of slave stations to the master station comprises a histogram of the noise and interference level measurements for the respective slave station for each frequency channel.

This allows signalling data to be reduced by sending processed data rather than raw data to the master station.

In an embodiment of the invention, determining a respective single combined noise and interference level estimate for each frequency channel comprises determining, for each frequency channel, a respective highest noise and interference level estimate of the noise and interference level estimates of each of the slave stations; and selecting one of the plurality of frequency channels comprises selecting the frequency channel having the lowest of the respective highest noise and interference level estimates.

This allows a frequency channel to be selected which maintains good performance for the slave station suffering the worst interference.

In an embodiment of the invention, determining a respective single combined noise and interference level estimate for each frequency channel comprises determining, for each frequency channel, a respective mean noise and interference level estimate of the noise and interference level estimates of each of the slave stations; and selecting one of the plurality of frequency channels comprises selecting the frequency channel having the lowest mean noise and interference level estimates.

This allows a frequency channel to be selected which maintains good throughput on average across the slave stations.

In an embodiment of the invention, the time division multiplex protocol is part of a time division duplex and time division multiplex protocol, and the selected frequency channel is for use in downlink timeslots of frames of the time division duplex and time division multiplex protocol.

Downlink timeslots are for use in transmission from the master to the slave stations.

In an embodiment of the invention, the selected frequency channel is for use in both uplink and downlink timeslots of frames of the time division duplex and time division multiplex protocol, the method comprising:

periodically measuring, within the predetermined timeslot of the time division duplex and time division multiplex protocol in which the master station and the slave stations do not transmit, a noise and interference level associated with each one of the plurality of frequency channels at the master station;

generating a plurality of histograms of the noise and interference level measurements for the master station; and determining a noise and interference level estimate for each frequency channel for the master station as a predetermined percentile of the histogram of measured noise and interference levels associated with the respective frequency channel, wherein the respective single combined noise and interference level estimate for each frequency channel is generated from the respective noise and interference level estimate for each of the plurality of slave stations and for the master station.

This allows a common frequency channel to be selected for reception at each of the slave stations and at the master station, taking into account the noise and interference environment at each of the slave stations and at the master station, which may different at each station.

In an embodiment of the invention, determining the respective single combined noise and interference level estimate for each frequency channel comprises determining, for each frequency channel, a respective highest noise and interference level estimate of the noise and interference level estimates for the master station and for each of the slave stations; and selecting one of the plurality of frequency channels comprises selecting the frequency channel having the lowest of the respective highest noise and interference level estimates.

This allows a frequency channel to be selected which maintains good performance for the station suffering the worst interference.

In an embodiment of the invention, determining the respective single combined noise and interference level estimate for each frequency channel comprises determining, for each frequency channel, a respective mean noise and interference level estimate of the noise and interference level estimates of each of the slave stations and for the master station; and selecting one of the plurality of frequency channels comprises selecting the frequency channel having the lowest mean noise and interference level estimates.

This allows a frequency channel to be selected which maintains good throughput on average across the slave stations and for the uplink and the downlink.

In an embodiment of the invention, the selected frequency channel is for use in downlink timeslots of frames of the time division duplex and time division multiplex protocol, and wherein the uplink timeslots of frames of the time division duplex and time division multiplex protocol use a second selected frequency.

In an embodiment of the invention, the method comprises periodically measuring, within the predetermined timeslot of the time division duplex and time division multiplex protocol in which the master station and the slave stations do not transmit, a noise and interference level associated with each one of the plurality of frequency channels at the master station;

generating a plurality of histograms of the noise and interference level measurements for the master station; and determining a noise and interference level estimate for each frequency channel for the master station as a predetermined percentile of the histogram of measured noise and interference levels associated with the respective frequency channel; and selecting a second of the plurality of frequency channels for use in subsequent uplink frames of the time division multiplex and time division multiplex protocol on the basis of the determined a noise and interference level estimate for each frequency channel for the master station.

This allows the downlink and the uplink to use different frequencies to allow improved throughput when, for example, the master station suffers interference at different frequencies than the slave stations.

In an embodiment of the invention, the method comprises:

sending a respective message from the master station to each slave station indicating the selected frequency channel; and dependent on receipt of an acknowledgment from each slave station, sending a trigger signal to each slave station indicating that the selected frequency channel should be used for a subsequent frame of the time division multiplex protocol.

This allows an efficient transition to the use of a selected frequency.

In accordance with a second aspect of the invention, there is provided a point to multipoint wireless communications system comprising a master station and a plurality of slave stations operating according to a time division multiplex protocol, the wireless communications system being operable to transmit and receive signals using a plurality of frequency channels, wherein:

each slave station comprises a processor configured to cause the respective slave station to periodically measure, within a predetermined timeslot of the time division multiplex protocol in which the master station and the slave stations do not transmit, a noise and interference level associated with each one of the plurality of frequency channels at the respective slave station; and the master station comprises a processor configured to cause the master wireless station to:

periodically receive noise and interference measurement data from each of the plurality of slave stations, the noise and interference measurement data having been measured, within a predetermined timeslot of the time division multiplex protocol in which the master station and the slave stations do not transmit;

generate a respective single combined noise and interference level estimate for each frequency channel from at least a respective noise and interference level estimate for each of the plurality of slave stations; and select one of the plurality of frequency channels for use in subsequent transmission of frames of the time division multiplex protocol on the basis of the generated combined noise and interference level estimates, wherein the respective single combined noise and interference level estimate for each frequency channel is generated from a plurality of histograms of the noise and interference level measurements for each of the plurality of slave stations, each histogram being associated with a respective frequency channel, and each histogram comprising a plurality of bins, each bin corresponding to a predetermined range of noise and interference levels associated with the respective frequency channel, by determining a noise and interference level estimate for each frequency channel for each of the plurality of slave stations as a predetermined percentile of the histogram of measured noise and interference levels associated with the respective frequency channel.

In accordance with a third aspect of the invention there is provided a master station of a point to multipoint wireless communications system comprising the master station and a plurality of slave stations, the wireless network being configured to operate according to a time division multiplex protocol and being operable to transmit and receive signals using a plurality of frequency channels, the master station comprising a processor configured to cause the master station to:

periodically receive noise and interference measurement data from each of the plurality of slave stations, the noise and interference measurement data having been measured, within a predetermined timeslot of the time division multiplex protocol in which the master station and the slave stations do not transmit;

generate a respective single combined noise and interference level estimate for each frequency channel from at least a respective noise and interference level estimate for each of the plurality of slave stations; and select one of the plurality of frequency channels for use in subsequent transmission of frames of the time division multiplex protocol on the basis of the generated combined noise and interference level estimates, wherein the respective single combined noise and interference level estimate for each frequency channel is generated from a plurality of histograms of the noise and interference level measurements for each of the plurality of slave stations, each histogram being associated with a respective frequency channel, and each histogram comprising a plurality of bins, each bin corresponding to a predetermined range of noise and interference levels associated with the respective frequency channel, by determining a noise and interference level estimate for each frequency channel for each of the plurality of slave stations as a predetermined percentile of the histogram of measured noise and interference levels associated with the respective frequency channel.

In accordance with a fourth aspect of the invention, there is provided a slave station of a point to multipoint wireless communications system comprising a master station and a plurality of slave stations operating according to a time division multiplex protocol, the wireless communications system being operable to transmit and receive signals using a plurality of frequency channels, the slave station comprising a processor configured to cause the slave station to:

periodically measure, within a predetermined timeslot of the time division multiplex protocol in which the master station and the slave stations do not transmit, a noise and interference level associated with each one of the plurality of frequency channels at the slave station; and periodically transmit noise and interference measurement data to the master station, the noise and interference measurement data comprising at least one histograms of the noise and interference level measurements for the slave station, the histogram being associated with a respective frequency channel, and the histogram comprising a plurality of bins, each bin corresponding to a predetermined range of noise and interference levels associated with the respective frequency channel.

Further features of the invention will be apparent from the following description of preferred embodiments of the invention, which are given by way of example only.

BRIEF DESCRIPTION OF THE DRAWINGS

FIG. 7 is a flow diagram of a method of spectrum management for the downlink and the uplink in an embodiment of the invention in which the uplink and downlink operate at the same frequency;

DETAILED DESCRIPTION

By way of example, embodiments of the invention will now be described in the context of a point-to-multipoint microwave broadband link operating as a time division duplex and time division multiplex system at carrier frequencies typically between 3 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands. Typical applications include backhaul systems and microwave Ethernet bridges, for providing connectivity to small cell and macro cell infrastructure, for leased line replacement, and for providing rapidly deployed video, voice and data services for disaster recovery.

Figure 1:
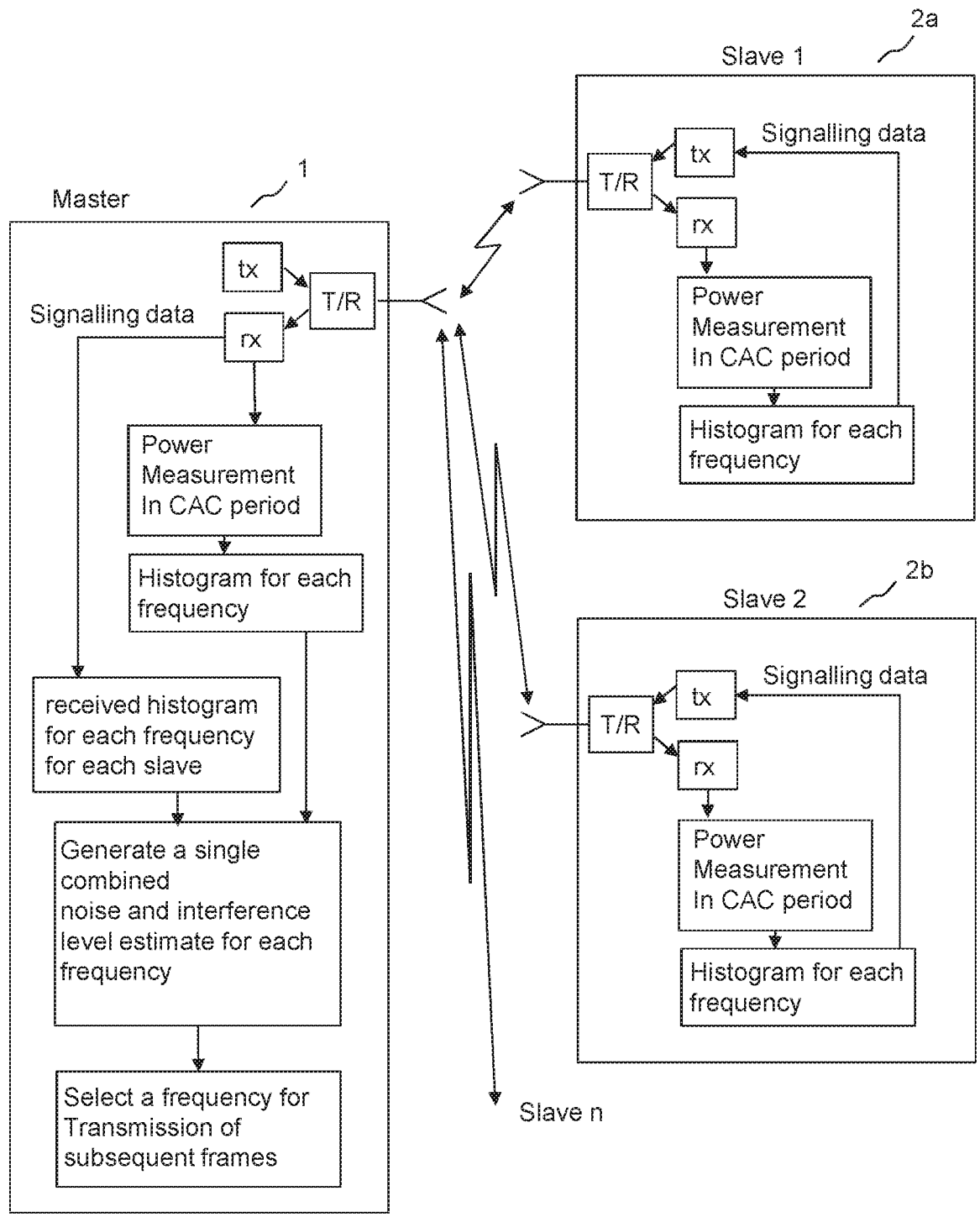
FIG. 1 shows an embodiment of the invention for a time division multiplex and time division duplex system in which the uplink and downlink operate at the same frequency.
Figure 2:
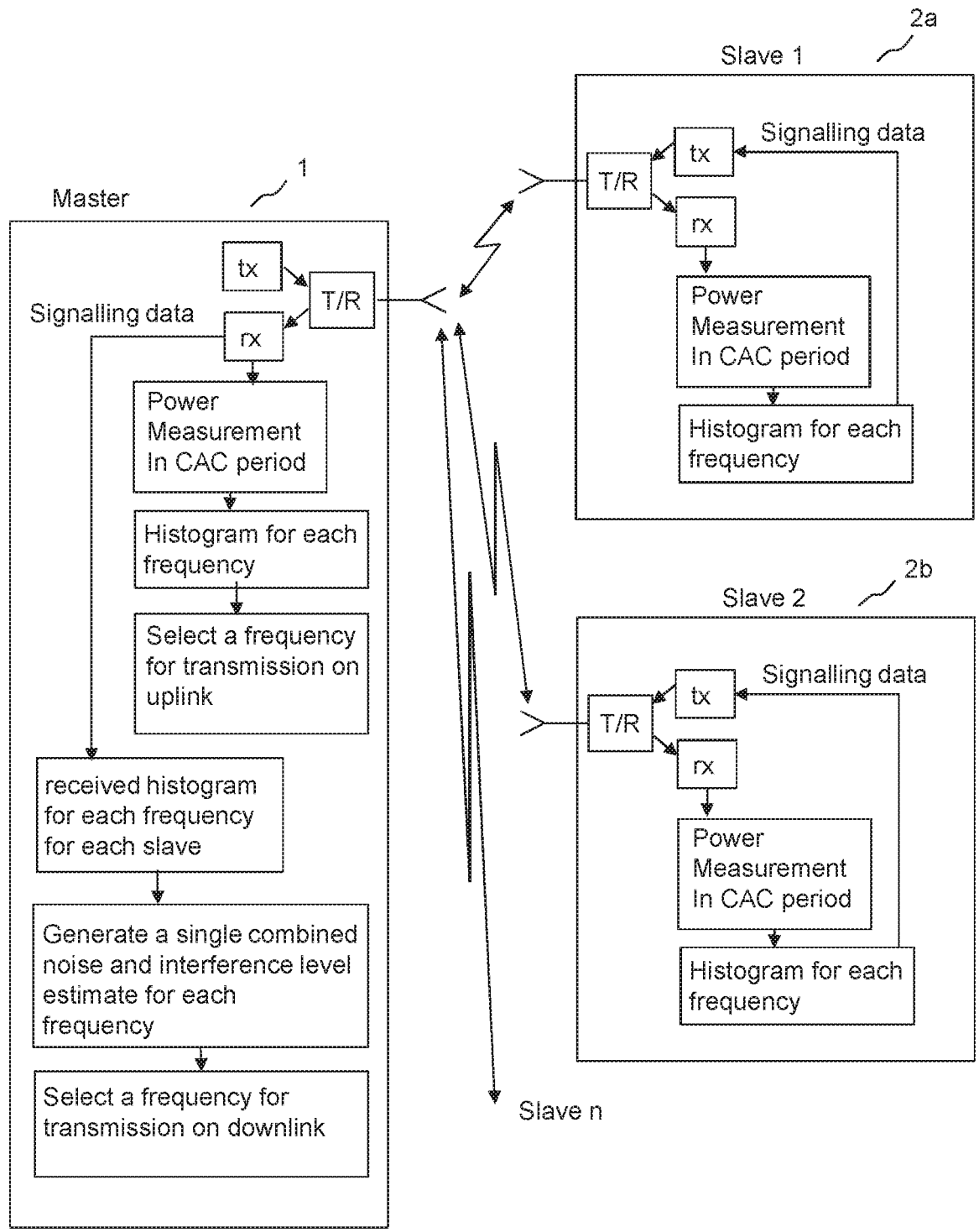
FIG. 2 shows an embodiment of the invention for a time division multiplex and time division duplex system in which the uplink and downlink may operate at different frequencies.

FIG. 1 shows an embodiment of the invention for a time division multiplex and time division duplex point to multipoint wireless communications system. The wireless communications system comprises a master station 1 and several slave stations 2a, 2b. The master station and slave stations may have similar construction and features, but the master station is designated as the master because it is in communication with each of the other stations, and typically the master has control of the selection of frequency channels for use in the downlink and/or uplink. In the embodiment illustrated in FIG. 1, the uplink, for transmissions from the slave stations to the master station, and the downlink, for transmissions from the master station to the slave stations, operate using the same frequency channel. In alternative embodiments, as illustrated by FIG. 2, the uplink and downlink may use different frequency channels. In both embodiments, the uplink and downlink transmit at different times. The master station and slave stations are potentially able to transmit and receive on a number of frequency channels, and embodiments of the invention relate to dynamic selection of frequency channels for use in the downlink and/or in the uplink, so that the system may operate efficiently in the presence of interference.

As shown in FIG. 1, a noise and interference level is measured periodically within a predetermined timeslot of the time division multiplex protocol in which the master station and the slave stations do not transmit, in this case the so-called CAC (Channel Availability Check) period. In successive CAC periods, different frequency channels may be measured, by re-tuning the receivers in the master and slave stations, to build up a series of measurements over time of the noise and interference level as a function of frequency at each station. The measurements may be represented as histograms of the samples of noise and interference levels for each frequency and for each station. So, as shown in FIG. 1, histograms of the noise and interference level measurements are generated for each of the slave stations. Each histogram has a number of bins, each bin corresponding to a predetermined range of noise and interference levels associated with a respective frequency channel. Once the histograms have been built up, a noise and interference level estimate may be determined from the histogram for each frequency channel for each of the stations as a predetermined percentile of the histogram of measured noise and interference levels associated with the respective frequency channel for the slave station. For example, a level that corresponds to the 99.9th percentile may be selected.

A single combined noise and interference level estimate is generated for each frequency channel from at least the noise and interference level estimates for each of the slave stations, and in the example of FIG. 1, from the noise and interference level estimates for the master station also. The single combined noise and interference level estimate for each frequency channel may be generated by determining, for each frequency channel, a highest noise and interference level estimate of the noise and interference level estimates of each of the stations, selecting the frequency channel having the lowest of the highest noise and interference level estimates. This allows a frequency channel to be selected which maintains good performance for the station suffering the worst interference. Alternatively, the single combined noise and interference level estimate for each frequency channel may be generated by determining, for each frequency channel, a mean noise and interference level estimate of the noise and interference level estimates of each of the stations, and selecting the frequency channel having the lowest mean noise and interference level estimates. This allows a frequency channel to be selected which maintains good throughput on average across the stations.

The selected frequency channel is used in subsequent transmission of frames of the time division multiplex protocol, so that a common frequency channel can selected for reception at each of the slave stations, and in the case of the system of FIG. 1, for reception at the Master station also, taking into account the noise and interference environment at each of the stations.

Noise and interference measurement data is sent periodically from each of the slave stations to the master station. As shown in FIG. 1, the noise and interference measurement data sent from each of the plurality of slave stations to the master station may comprise a histogram of the noise and interference level measurements for the respective slave station for each frequency channel. Alternatively, the noise and interference measurement data may comprise noise and interference level estimates for each frequency channel, and the histograms may be generated at the master station.

In the example shown in FIG. 1, the selected frequency channel is for use in both uplink and downlink timeslots of frames of the time division duplex and time division multiplex protocol.

FIG. 2 shows an embodiment of the invention for a time division multiplex and time division duplex system in which the uplink and downlink may operate at different frequencies. In this case, downlink timeslots use a frequency channel selected on the basis of combined noise and interference estimates for the slave stations only and not the master station, and the uplink timeslots of frames of the time division duplex and time division multiplex protocol use a second frequency channel selected on the basis of noise and interference estimates for the master station. In this embodiment, the method comprises periodically measuring, within the predetermined timeslot of the time division duplex and time division multiplex protocol in which the master station and the slave stations do not transmit, a noise and interference level associated with each one of the plurality of frequency channels at the master station, and generating histograms of the noise and interference level measurements for the master station. Then, a noise and interference level estimate is determined for each frequency channel for the master station as a predetermined percentile of the histogram of measured noise and interference levels associated with the respective frequency channel. The second frequency channel is selected for use in subsequent uplink frames of the time division multiplex and time division multiplex protocol on the basis of the determined a noise and interference level estimate for each frequency channel for the master station. In this way, the downlink and the uplink may use different frequencies to allow improved throughput when, for example, the master station suffers interference at different frequencies than the slave stations.

An efficient transition to the use of a selected frequency may be effected by sending a respective message from the master station to each slave station indicating the selected frequency channel, and if an acknowledgment is received from each slave station, sending a trigger signal to each slave station indicating that the selected frequency channel should be used for a subsequent frame of the time division multiplex protocol. The messages, acknowledgement and trigger signal may be sent using an initial, or previously-selected, frequency channel. The master and slave stations may be set to initially communicate on start-up using a pre-determined initial frequency channel.

Figure 3:
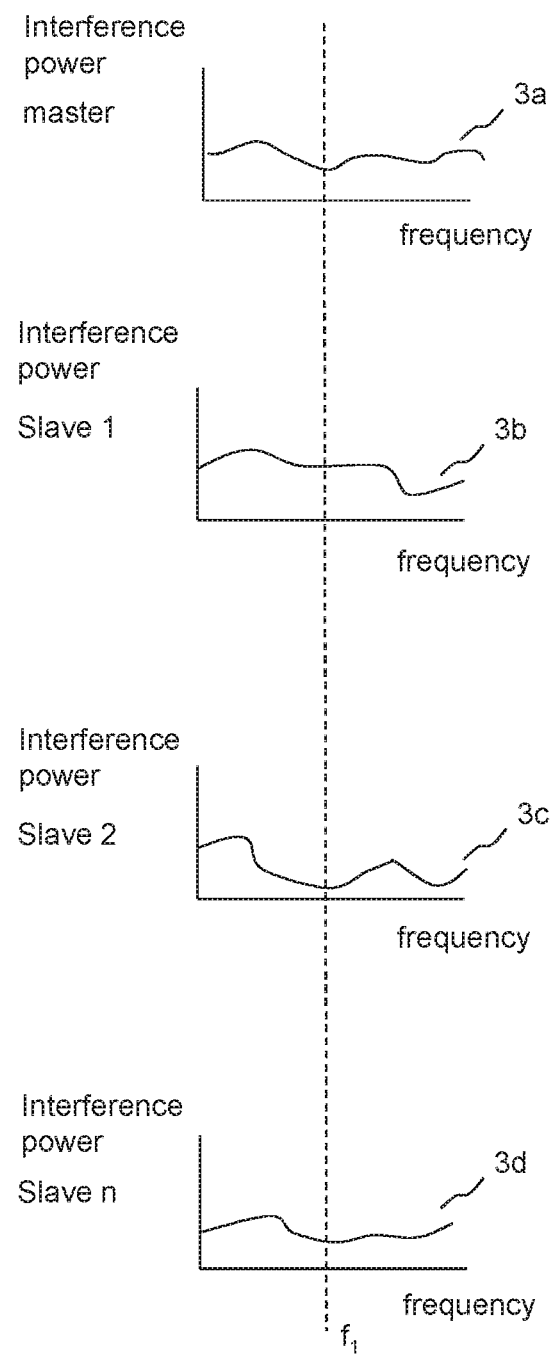
FIG. 3 shows an example of noise and interference level vs frequency at master and slave stations.

FIG. 3 shows an example of noise and interference level vs frequency 3a, 3b, 3c, 3d at master and slave stations. It can be seen that because the stations may be situated at different geographical locations, interference may be received at different levels at each station due to differences in propagation from the interference sources to each station. As a result, the distribution of interference power with frequency is typically different at each station.

Figure 4:
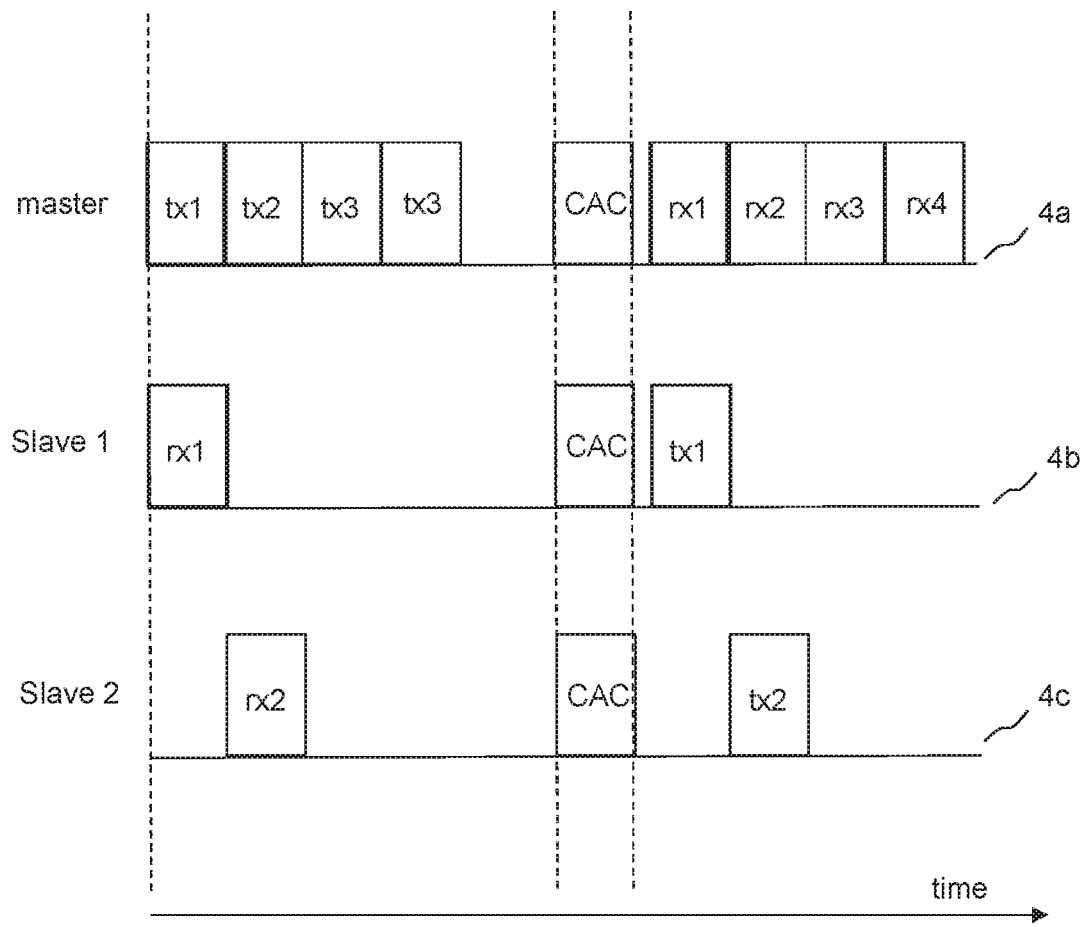
FIG. 4 shows transmit and receive timeslots in a time division multiplex and time division duplex system, showing the CAC period in which neither the master station nor the slave stations transmit.

FIG. 4 shows transmit and receive timeslots in a time division multiplex and time division duplex system, showing the CAC period in which neither the master station nor the slave stations transmit. A sequence of transmit and receive timeslots is shown for the master station at 4a, for a first slave station at 4b and for a second slave station at 4b.

Figure 5:
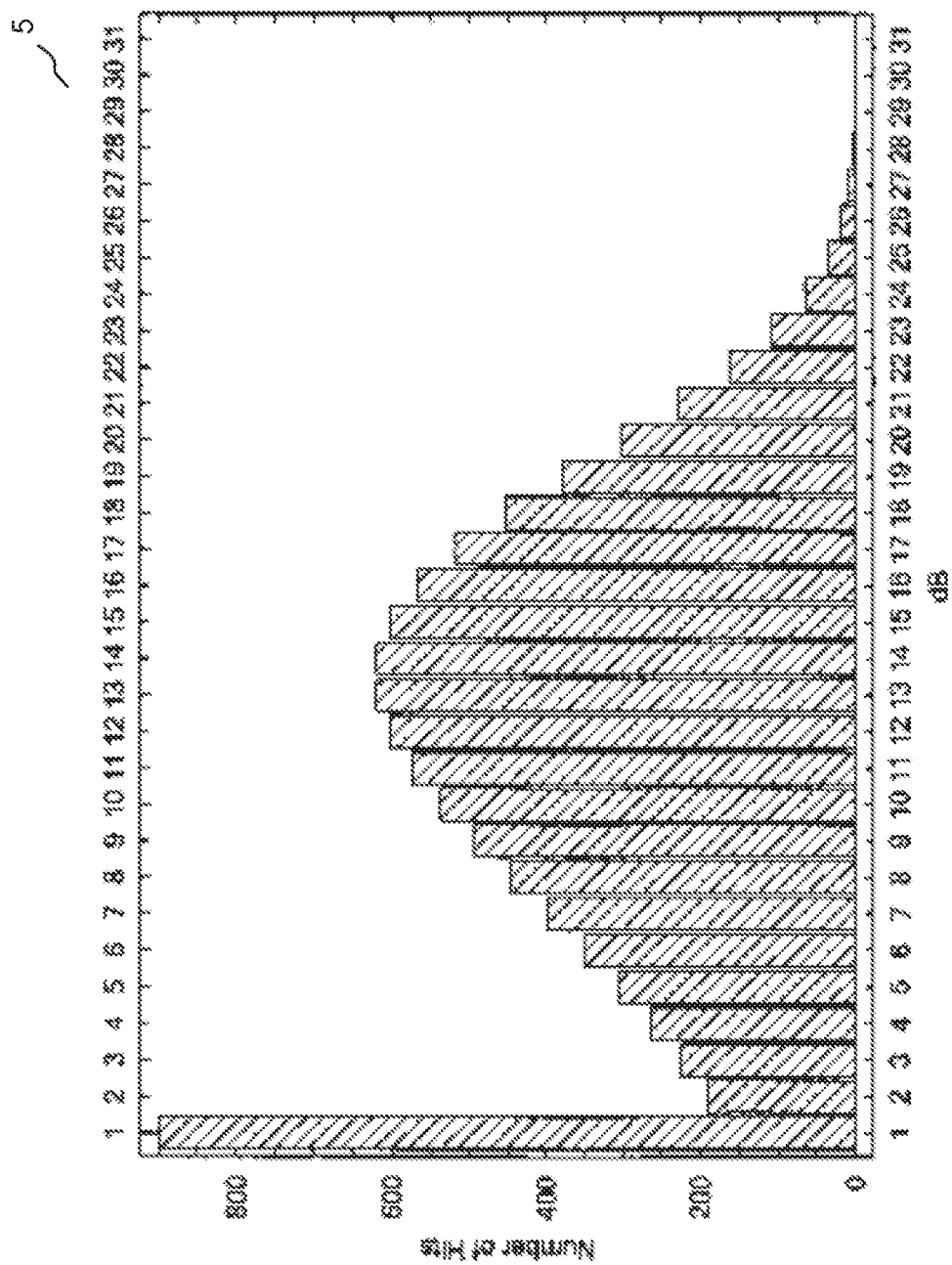
FIG. 5 shows an example of a histogram of measured noise and interference levels at a wireless station.

FIG. 5 shows an example of a histogram 5 of measured noise and interference levels at a wireless station. Here the histogram is represented graphically. The histogram may be represented electronically by the ordering of measured noise and interference data in increasing magnitude so that a level for a given percentile of samples may be determined. The histogram may be represented by various data formats, which may represent a number of measured samples of noise and interference levels which fall into each of a number of power ranges.

Figure 6:
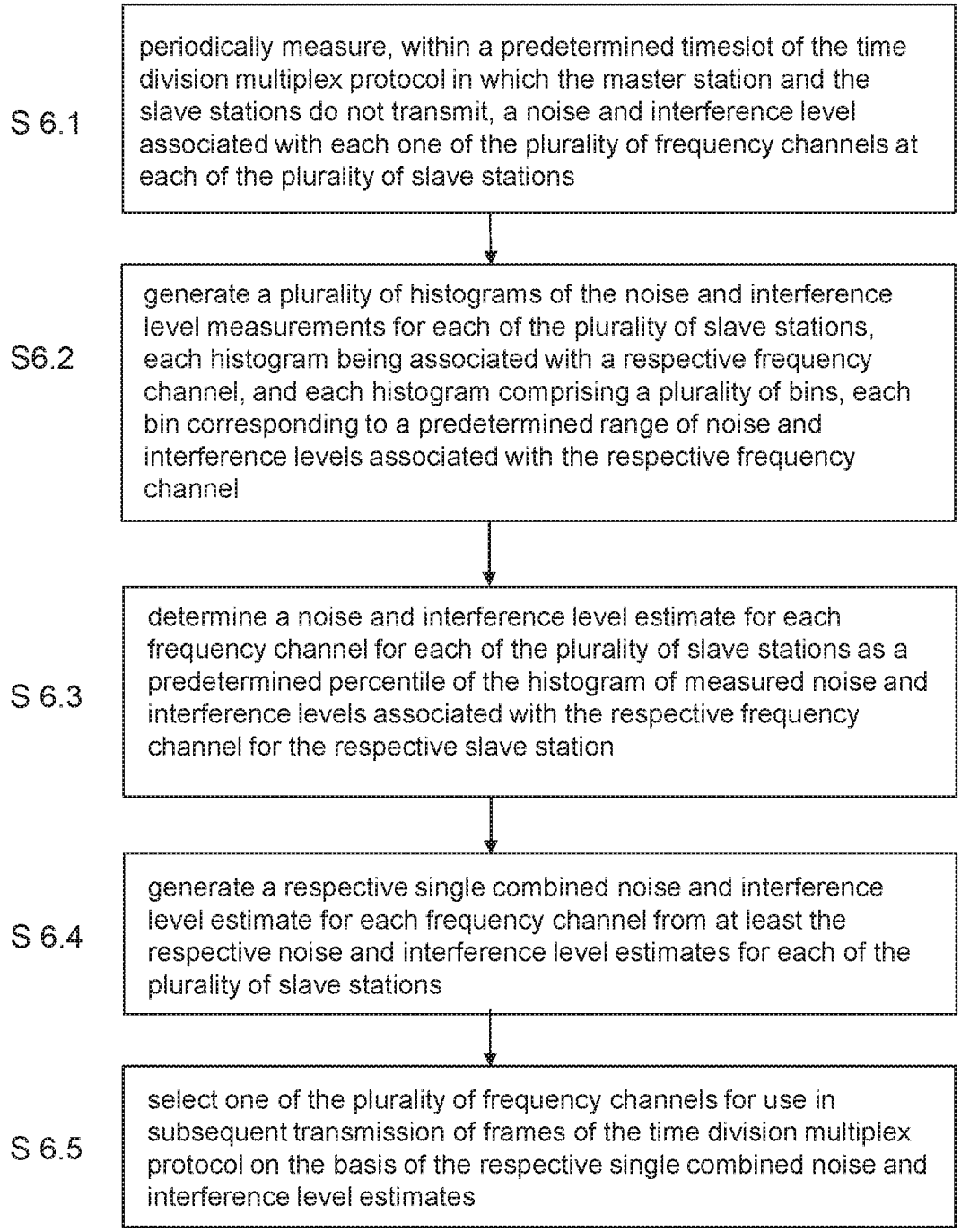
FIG. 6 is a flow diagram of a method of spectrum management for at least the downlink in an embodiment of the invention.

FIG. 6 is a flow diagram of a method of spectrum management for at least the downlink in an embodiment of the invention, as steps S6.1 to S6.5.

FIG. 7 is a flow diagram of a method of spectrum management for the downlink and the uplink in an embodiment of the invention in which the uplink and downlink operate at the same frequency, as steps S7.1 to S7.4.

Figure 8:
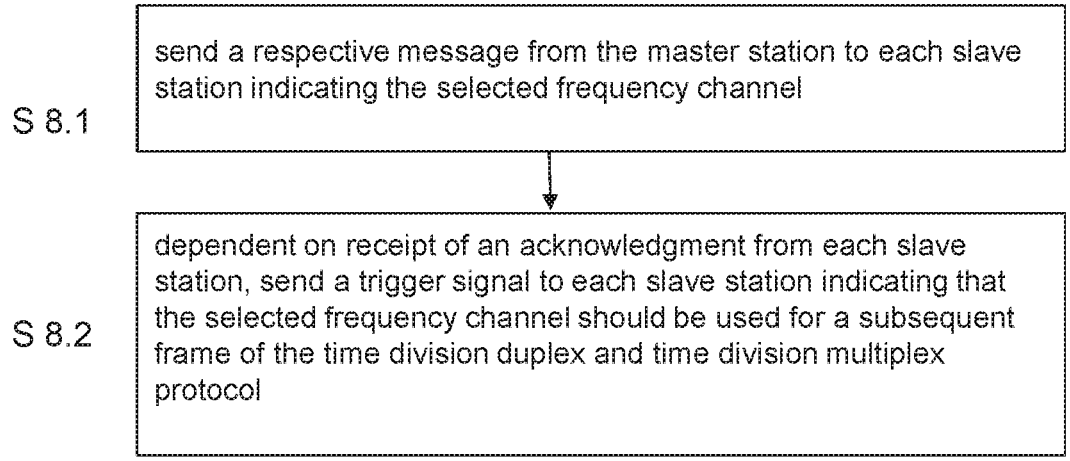
FIG. 8 is a flow diagram of a method of signalling between master and slave stations to provide an efficient method of changing frequency channel.

FIG. 8 is a flow diagram of a method of signalling between master and slave stations to provide an efficient method of changing frequency channel, as steps S8.1 and S8.2.

Figure 9:
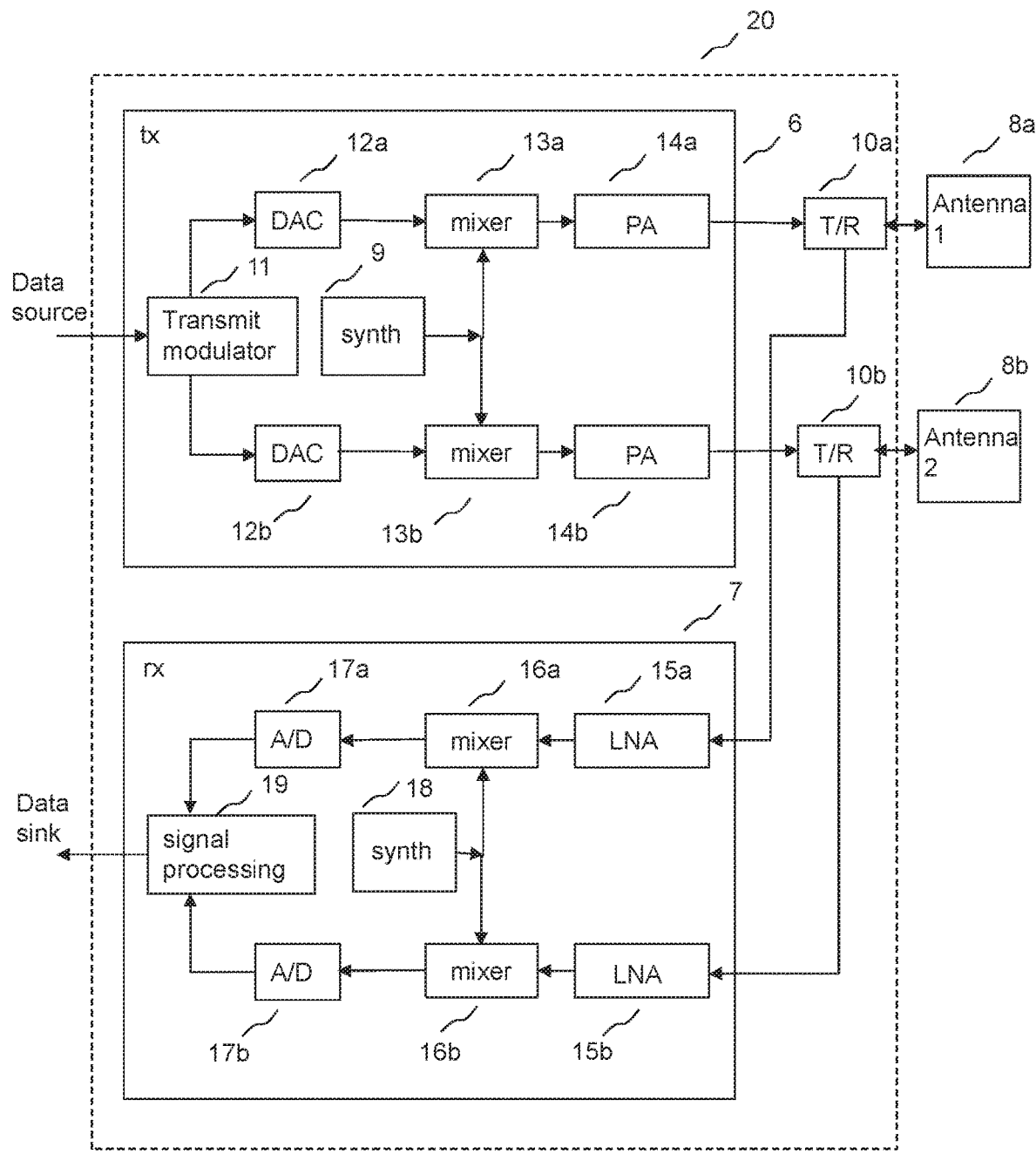
FIG. 9 is a block diagram of an example of a transceiver at a master or slave station in an embodiment of the invention in a MIMO radio system.
Figure 10:
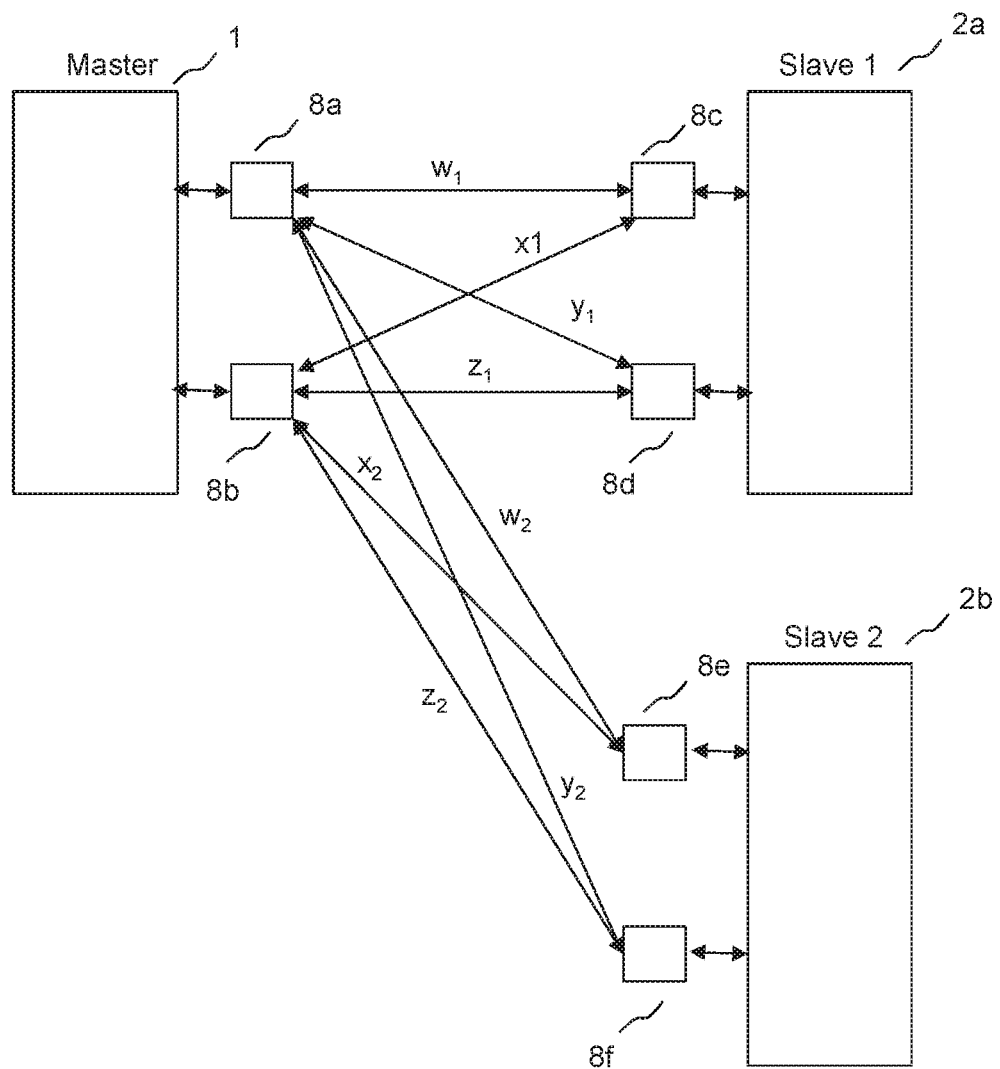
FIG. 10 is a block diagram of a point to multipoint MIMO system in an embodiment of the invention.

FIGS. 9 and 10 are block diagrams showing an example of the embodiment of the invention in a MIMO point to multipoint radio system. FIG. 9 is a block diagram of an example of a transceiver 20 at a master or slave station and FIG. 10 is a block diagram of a point to multipoint MIMO system including a master and two slave stations. In addition to the signal path components shown, a master station and each of the slave stations typically comprises one or more control processors, which are configured to implement the spectrum management method and signalling between the master and slave stations to implement the method. The signalling may comprise messaging between master and slave stations and may be carried by designated signalling frames within a data frame structure which may also carry data payload frames. The control processors may be implemented using one or more digital processors, such as for example microcontrollers or digital signal processors, and may comprise memory holding program code to implement the spectrum management method.

In FIG. 10, a master station 1 is shown, comprising a transmitter and receiver, in communication with first slave station 2a "Slave 1". A second slave station 2b "Slave 2" is shown, of similar construction to Slave 1, also being in communication with the master station 1. A wireless broadband communications system is provided that is capable of increasing data throughput and link availability through more efficient use of the electromagnetic spectrum allocated to the system. The wireless broadband communications system of FIGS. 9 and 10 is a multiple input multiple output (MIMO) system including a plurality of transceivers and a plurality of antennas operable to transmit and receive signals over a plurality of communications channels between the master station 1 and each of the slave stations 2a, 2b. In the preferred embodiment, the MIMO wireless communications system is a 2:2 MIMO system comprising two antennas disposed at each end of each communications link, shown as antennas 8a, 8b at the master station 1, antennas 8c and 8d at Slave 1, and 8e and 8f at Slave 2. The 2:2 MIMO system can be implemented as a non-line-of-sight (NLOS) system or a line-of-sight (LOS) system. In the event the 2:2 MIMO system is implemented as a NLOS system, the communications links can be deployed in a high scattering environment, for example, an urban environment including numerous scattering objects and obstructions such as buildings, trees, hills, and/or automobiles. In this embodiment, the NLOS system is configured to transmit signals over the plurality of channels along four signal paths between the respective ends of the link. The transmitted signals undergo multi-path propagation while being scattered by the various objects within the environment. In the event the 2:2 MIMO system is implemented as a LOS system, the links can be deployed in a reduced scattering environment such as a suburban or rural location. In this embodiment, the two antennas disposed at each end of each link 8a-8f are each configured to transmit signals over the plurality of channels along two signal paths.

The presently disclosed NLOS wireless communications system employs a combination of space-time coding and multiple diversity techniques to achieve increased de-correlation of the multiple signal paths. For example, the two antennas disposed at each end of each communications link can employ horizontal and vertical polarization, respectively, to provide polarization diversity. Further, each transceiver at the respective ends of each link can be configured to transmit at least one signal via a first antenna and a delayed version of the signal via a second antenna to provide delay diversity. Moreover, the two antennas disposed at each end of each link can have a predetermined spacing to provide spatial diversity. The two antennas at each end of each link 8a-8f can also be implemented as a single dual polarized antenna, thereby achieving polarization diversity while reducing space requirements.

The presently disclosed LOS wireless communications system includes a single dual polarized antenna disposed at one end of a communications link, and two vertically separated and horizontally and vertically polarized antennas disposed at the other end of each link, thereby providing polarization and spatial diversity. The LOS system employs a combination of space-time coding and spatial/polarization diversity techniques to minimize water and ground bounce nulls. By employing space-time coding and multiple modes of diversity in the presently disclosed NLOS and LOS systems, de-correlation of the signal paths is increased, and the effectiveness of space-time coding for increasing the gain in the received signal strength and for reducing signal fading is enhanced.

A reduced cost, high performance, wireless broadband communications system is disclosed that can transmit signals over point to multipoint communications links with multiple modes of diversity, thereby allowing signals having very low correlation to propagate over the link along multiple orthogonal paths. Because the multiple signal paths are de-correlated, the wireless communications system can more effectively apply space-time coding techniques for increasing data rates and spectral efficiencies. The presently disclosed wireless communications system can be implemented as a non-line-of-sight (NLOS) system or a line-of-sight (LOS) system. In the NLOS system, orthogonal frequency division modulation (OFDM) waveforms are employed to transmit signals over multiple orthogonal channels, thereby reducing multi-path interference and frequency selective fading. The NLOS system can also be configured to implement an adaptive modulation technique to achieve high data rates in the presence of channel variability, and a spectrum management technique to achieve increased data throughput and link availability. The spectrum management technique also facilitates system installation. In the LOS system, space-time coding and spatial and polarization diversity techniques are employed to minimize water and ground bounce nulls. The presently disclosed wireless communications system provides levels of data throughput, link availability, and system performance that have heretofore been unattainable in wireless broadband communications systems.

FIGS. 9 and 10 depict an illustrative embodiment of a wireless broadband communications system operative in accordance with the present invention. In the illustrated embodiment, the wireless communications system is a point to multipoint multiple input multiple output (MIMO) system including a plurality of transceivers 10 and a plurality of high gain antennas 8a-8f. Specifically, the MIMO system is a 2:2 MIMO system, in which the two antennas 8a, 8b and the two antennas 8c, 8d are located at opposite ends of a first communications link between the master station 1 and a first slave station 2a Slave 1, and a similar communication link is provided from the two antennas 8a, 8b to two antennas 8e, 8f of the second slave station 2a Slave 2.

It should be understood that the MIMO system may alternatively be implemented as a 2:4, 2:n, n:n, or any other suitable type of MIMO system. The wireless communications system is depicted in FIG. 10 as a 2:2 MIMO system for purposes of illustration.

As shown in FIG. 9 and FIG. 10, the 2:2 MIMO system includes a first transceiver 20 operatively connected to the antennas 8a, 8b at one end of a first communications link, and a transceiver typically of similar construction to the first transceiver 20 operatively connected to the antennas 8c, 8d at the other end of the first link. As shown in FIG. 10, a further transceiver, typically of similar construction to the first transceiver, is operatively connected to the antennas 8e, 8f at the other end of a second link. In the event the 2:2 MIMO system is implemented as a NLOS system, the link can be deployed in a high scattering environment, e.g., an urban environment including numerous scattering objects and obstructions such as buildings, trees, hills, and/or automobiles. In the presently disclosed NLOS system, the antennas 8a, 8b, 8c, 8d are operative to transmit/receive signals propagating along four signal paths w1, x1, y1, z1 between the respective ends of the link. The transmitted signals propagate along the four paths w1, x1, y1, z1 while being scattered by the various objects within the environment.

Similarly, for the second link, the antennas 8a, 8b, 8e, 8f are operative to transmit/receive signals propagating along four signal paths w2, x2, y2, z2 between the respective ends of the link.

In the event the 2:2 MIMO system is implemented as a LOS system, the link can be deployed in a reduced scattering environment such as a suburban or rural location. In the presently disclosed LOS system, the antennas 8a, 8b, 8c and 8d are operative to transmit/receive signals propagating along the two signal paths w1, z1 between the respective ends of the first link, and the antennas 8a, 8b, 8e and 8f are operative to transmit/receive signals propagating along the two signal paths w2, z2 between the respective ends of the second link.

As shown in FIG. 9, the transceiver 20 includes a transmitter 6 and a low noise receiver 7. The transmitter 6 includes the following functional components: a transmit modulator 11, digital-to-analog (D-to-A) converters 12a, 12b, a frequency synthesizer 9, mixers 13a, 13b, and high power amplifiers 14a, 14b. It is understood that a transmitter in the master station 1 or a slave station 2a, 2b can include the same functional components as the transmitter 20. FIG. 9 depicts the functional components of the transmitter 6 for clarity of illustration. Specifically, a data source provides user data to the transmit modulator 11, which provides modulated data outputs to the D-to-A converters 12a, 12b and controls the operation of the synthesizer 9. The D-to-A converters 12a, 12b convert the transmit modulator outputs to analog signals, and provide the analog signals to the mixers 13a, 13b. Next, the synthesizer 9 provides suitable synthesized carriers to the mixers 13a, 13b, which mix up the analog signals to radio frequency (RF) for transmission of frames at the selected frequency channel. The power amplifiers 14a, 14b then amplify the RF signals, and provide the amplified signals via a respective transmit/receive switch 10a, 10b to the antennas 8a, 8b for subsequent transmission over the communications link.

The receiver 7 includes the following functional components: mixers 16a, 16b, analog-to-digital (A-to-D) converters 17a, 17b, a frequency synthesizer 18, and a signal processor 19. It is understood that the receivers in the master and slave stations can include the same functional components as the receiver 7. FIG. 9 depicts the functional components of the receiver 7 for clarity of illustration. Specifically, the RF signals received by the antennas 8a, 8b are provided to the mixers 16a, 16b, respectively, which mix the RF signals to analog baseband signals using suitable synthesized frequencies generated by the synthesizer 18. Next, the A-to-D converters 17a, 17b convert the analog baseband signals to digital baseband signals. The signal processor 19 then processes (e.g., decodes and demodulates) the digital signals to recover the user data, which is subsequently provided to a data sink. The signal processor 19 also controls the operation of the synthesizer 18 to enable reception of frames at the selected frequency channel. In one embodiment, the signal processor 19 operates as a maximum ratio combiner (also known as an optimum combiner), which combines the signals by conceptually rotating the phase of each signal to be in alignment, and then adjusting the amplitude of each signal to maximize the combined signal-to-noise ratio.

It is noted that the data sources and the data sinks may comprise respective connections to one or more local area networks (LANs) or routers. Alternatively, the data sources and the data sinks may comprise direct connections to respective user computers. In addition, each one of the transceivers 20 may be implemented as a software-defined radio. For example, the transmit modulator 11 included in each transmitter 6 may employ channel modulation waveforms that are defined in software, and the signal processor 19 included in each receiver 7 may demodulate the channel waveforms using demodulation techniques that are defined in software. It should be appreciated, however, that the functions necessary to implement the transceivers 20 may alternatively be embodied in whole or in part using hardware or software or some combination thereof using signal processors, micro-controllers, microprocessors, or any other suitable hardware and/or software.

As described above, the 2:2 MIMO system can be implemented as a non-line-of-sight (NLOS) system. When the system is implemented as a NLOS system, the system has the following capabilities: (1) the capability of overcoming losses due to scattering objects and obstructions in the environment (also known as excess path loss), (2) the capability of mitigating signal fading, and (3) the capability of operating in dispersive channels. In the presently disclosed embodiment, the 2:2 MIMO system overcomes excess path loss by providing a high system gain, which is achieved via the high power amplifiers 14a, 14b, the low noise receivers 15a, 15b, and the high gain antennas 8a-8f. Further, the 2:2 MIMO system mitigates signal fading, which generally accompanies the excess path loss, by employing a suitable space-time coding technique in combination with multiple diversity modes. Moreover, the 2:2 MIMO system provides the capability of operating in a dispersive channel by employing orthogonal frequency division modulation (OFDM) to accommodate the level of dispersion in the channel and the channel dynamics.

In addition, the 2:2 MIMO system implements an adaptive modulation technique to achieve increased data rates, and a spectrum management technique to obtain increased levels of data throughput and link availability. In the presently disclosed embodiment, the adaptive modulation technique operates by changing the modulation mode based on the signal-to-noise and distortion (SINAD) that would be available when operating in the next modulation level (step up or step down in modulation constellation). The spectrum management technique operates by measuring the interference on each channel, and determining the best channel available for transmission based on the channel interference measurements.

The 2:2 MIMO system mitigates the fading of signals propagating along the four signal paths w1, x1, y1, z1 between the master station 1 and the first slave station 2a, and along the four signal paths w2, x2, y2, z2 between the master station 1 and the second slave station 2b, and also along corresponding paths to further slave stations as appropriate by employing space-time coding and multiple diversity modes. For example, the 2:2 MIMO system can employ space-time block coding, layered space-time coding, space-time trellis coding, feedback space-time coding, spatial multiplexing space-time coding, or any other suitable type of space-time coding technique. The 2:2 MIMO system employs a selected space-time coding technique in combination with multiple diversity modes, for example, spatial diversity, polarization diversity, and delay diversity, to achieve increased de-correlation of the four paths w1, x1, y1, z1 between the master station 1 and the first slave station 2a, and between the four paths w2, x2, y2, z2 between the master station 1 and the second slave station 2b, and also between corresponding paths to further slave stations.

The 2:2 MIMO system reduces the level of channel dispersion by employing multiple carriers in an OFDM waveform and transmitting signals using the multiple carriers over multiple orthogonal channels. Because the carriers in the OFDM waveform are orthogonal to each other, multi-path interference and frequency selective fading are reduced. Further, because the fading of the transmitted signals is de-correlated, the system gain across the multiple orthogonal channels is increased. For example, the 2:2 MIMO system may employ on the order of one thousand carriers or any other suitable number of carriers. It is noted that if the transceivers 20 are implemented as software-defined radios, then the transmit modulator 11 can be configured to operate using OFDM waveforms defined in software, and the signal processor can be configured to demodulate the OFDM waveforms using demodulation techniques defined in software.

As described above, the 2:2 MIMO system provides for increased data rates in the presence of channel variability via an adaptive modulation technique. Specifically, the system employs adaptive modulation to adjust the modulation mode to accommodate changes in the channel characteristics over time. The modulation mode may comprise one or more transmission parameters such as a modulation level, a coding rate, a symbol rate, a transmission power level, antenna directional parameters, space-time coding parameters, or any other suitable transmission parameter. For example, in the event a change in the channel characteristics increases the ratio of the signal-to-noise and distortion (SINAD), the modulation level can be increased or the coding rate can be decreased to obtain an increased data rate. Alternatively, in the event a change in the channel characteristics decreases the SINAD, the modulation level can be decreased or the coding rate can be increased to maintain an acceptable code word error rate.

The 2:2 MIMO system implements a spectrum management technique to obtain increased levels of data throughput and link availability. In the presently disclosed embodiment, the spectrum management technique includes measuring the level of noise and interference on each frequency channel, and then determining the best channel available for transmission based on the channel noise/interference measurements. In general, the system either instantaneously works or does not work, depending upon the level of the signal to noise ratio at the receiver. In the preferred embodiment, the system performs automatic retransmission request (ARQ) operations, causing the overall transmission to be about 1:1000000 packet error rate. It is noted that the level of noise and interference in the transmission environment can vary from a high mean noise/interference level to a low mean noise/interference level, but significantly high spikes of noise may also be present due to radar. In one embodiment, the spectrum management technique makes multiple noise/interference measurements for each channel, generates a histogram for each channel using the noise/interference measurements, determines the 99.9 percentile for each channel, and selects the channel with the lowest 99.9 percentile (corresponding to the lowest level of noise/interference) as the best channel available for transmission. It should be appreciated that the functions necessary to implement the spectrum management technique may be embodied in whole or in part using hardware or software or some combination thereof using the signal processor 19 included in the receiver 7.

FIG. 5 depicts a diagram illustrating a histogram generated using representative noise/interference measurements for an exemplary frequency channel. As shown in FIG. 5, the illustrative histogram 5 includes a plurality of bins, in which each bin corresponds to a predetermined range of noise and interference levels (e.g., 1 dB) associated with the respective channel. Further, the numbers along the horizontal axis of the diagram correspond to the number of decibels above the thermal noise level for the receiver, and the numbers along the vertical axis correspond to the number of samples. To find the 99.9 percentile point for this illustrative histogram, all of the samples are added together to obtain a total number of samples "N". The number N is then multiplied by 0.999 to obtain a value "N999". Finally, the number of samples in each bin are counted until the value N999 is exceeded. Using this procedure, the 99.9 percentile point of the illustrative histogram of FIG. 5 is determined to be about 26 dB.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of spectrum management in a point to multipoint wireless communications system comprising a master station and a plurality of slave stations operating according to a time division multiplex protocol, the wireless communications system being operable to transmit and receive signals using a plurality of frequency channels, the method comprising:

periodically measuring, within a predetermined timeslot of the time division multiplex protocol in which the master station and the slave stations do not transmit, a noise and interference level associated with each one of the plurality of frequency channels at each of the plurality of slave stations;

generating a plurality of histograms of the noise and interference level measurements for each of the plurality of slave stations, each histogram being associated with a respective frequency channel, and each histogram comprising a plurality of bins, each bin corresponding to a predetermined range of noise and interference levels associated with the respective frequency channel;

determining a noise and interference level estimate for each frequency channel for each of the plurality of slave stations as a predetermined percentile of the histogram of measured noise and interference levels associated with the respective frequency channel for the respective slave station;

generating a respective single combined noise and interference level estimate for each frequency channel from at least the respective noise and interference level estimates for each of the plurality of slave stations; and selecting one of the plurality of frequency channels for use in subsequent transmission of frames of the time division multiplex protocol on a basis of the respective single combined noise and interference level estimates, wherein the time division multiplex protocol is part of a time division duplex and time division multiplex protocol, and the selected frequency channel is for use in downlink timeslots of frames of the time division duplex and time division multiplex protocol, and wherein uplink timeslots of frames of the time division duplex and time division multiplex protocol use a second selected frequency, wherein the second selected frequency is selected by:

periodically measuring, within the predetermined timeslot of the time division duplex and time division multiplex protocol in which the master station and the slave stations do not transmit, a noise and interference level associated with each one of the plurality of frequency channels at the master station;

generating a plurality of histograms of the noise and interference level measurements for the master station;

determining a noise and interference level estimate for each frequency channel for the master station as a predetermined percentile of the histogram of measured noise and interference levels associated with the respective frequency channel; and selecting a second of the plurality of frequency channels for use in subsequent uplink frames of the time division multiplex and time division multiplex protocol on a basis of the determined a noise and interference level estimate for each frequency channel for the master station.

2. The method according to claim 1, comprising periodically sending noise and interference measurement data from each of the plurality of slave stations to the master station.

3. The method according to claim 2, wherein the noise and interference measurement data sent from each of the plurality of slave stations to the master station comprises the determined noise and interference level estimate for each frequency channel, and the plurality of histograms is generated at the master station.

4. The method according to claim 2, wherein the noise and interference measurement data sent from each of the plurality of slave stations to the master station comprises a histogram of the noise and interference level measurements for the respective slave station for each frequency channel.

5. The method according to claim 3, wherein determining a respective single combined noise and interference level estimate for each frequency channel comprises determining, for each frequency channel, a respective highest noise and interference level estimate of the noise and interference level estimates of each of the slave stations; and
   selecting one of the plurality of frequency channels comprises selecting the frequency channel having the lowest of the respective highest noise and interference level estimates.

6. The method according to claim 3, wherein determining a respective single combined noise and interference level estimate for each frequency channel comprises determining, for each frequency channel, a respective mean noise and interference level estimate of the noise and interference level estimates of each of the slave stations; and
   selecting one of the plurality of frequency channels comprises selecting the frequency channel having the lowest mean noise and interference level estimates.

7. A point to multipoint wireless communications system comprising a master station and a plurality of slave stations operating according to a time division multiplex protocol, the wireless communications system being operable to transmit and receive signals using a plurality of frequency channels, wherein:
   each slave station comprises a processor configured to cause the respective slave station to periodically measure, within a predetermined timeslot of the time division multiplex protocol in which the master station and the slave stations do not transmit, a noise and interference level associated with each one of the plurality of frequency channels at the respective slave station; and
   the master station comprises a processor configured to cause the master station to:
      periodically receive noise and interference measurement data from each of the plurality of slave stations, the noise and interference measurement data having been measured, within a predetermined timeslot of the time division multiplex protocol in which the master station and the slave stations do not transmit;
      generate a respective single combined noise and interference level estimate for each frequency channel from at least a respective noise and interference level estimate for each of the plurality of slave stations; and
      select one of the plurality of frequency channels for use in subsequent transmission of frames of the time division multiplex protocol on a basis of the generated combined noise and interference level estimates,
   wherein the respective single combined noise and interference level estimate for each frequency channel is generated from a plurality of histograms of the noise and interference level measurements for each of the plurality of slave stations, each histogram being associated with a respective frequency channel, and each histogram comprising a plurality of bins, each bin corresponding to a predetermined range of noise and interference levels associated with the respective frequency channel, by determining a noise and interference level estimate for each frequency channel for each of the plurality of slave stations as a predetermined percentile of the histogram of measured noise and interference levels associated with the respective frequency channel,
   wherein the time division multiplex protocol is part of a time division duplex and time division multiplex protocol, and the selected frequency channel is for use in downlink timeslots of frames of the time division duplex and time division multiplex protocol, and wherein uplink timeslots of frames of the time division duplex and time division multiplex protocol use a second selected frequency, wherein the second selected frequency is selected by:
   periodically measuring, within the predetermined timeslot of the time division duplex and time division multiplex protocol in which the master station and the slave stations do not transmit, a noise and interference level associated with each one of the plurality of frequency channels at the master station;
   generating a plurality of histograms of the noise and interference level measurements for the master station;
   determining a noise and interference level estimate for each frequency channel for the master station as a predetermined percentile of the histogram of measured noise and interference levels associated with the respective frequency channel; and
   selecting a second of the plurality of frequency channels for use in subsequent uplink frames of the time division multiplex and time division multiplex protocol on a basis of the determined a noise and interference level estimate for each frequency channel for the master station.

* * * * *